Dec. 25, 1962 R. R. RANEY ETAL 3,070,006
CROP WAFERING MECHANISM
Filed March 8, 1960

INVENTORS.
RUSSELL R. RANEY.
BY VICTOR C. FUHRWERK.

ATTORNEYS.

3,070,006
CROP WAFERING MECHANISM
Russell R. Raney, Greenville, and Victor C. Fuhrwerk, Celina, Ohio, assignors to Avco Corporation, Coldwater, Ohio, a corporation of Delaware
Filed Mar. 8, 1960, Ser. No. 13,574
7 Claims. (Cl. 100—192)

This invention relates to a crop wafering mechanism employing a ram type compacting mechanism, with a reciprocating ram and oscillating-accommodating press, primarily useful in making wafers of crop material such as hay. The modern development of mechanisms for compacting hay into pellet or wafer form by extruding material through a tubular die has demonstrated that a major amount of energy is expended in overcoming friction of movement of material through the tube, there being several times more energy required to overcome friction in a conventional reciprocating ram type unit than is required to complete the compaction of the material, and the provision of power for such friction requirements result in field machines of relatively large size and horse power.

It is a primary object of the invention to provide means to vary the extruding tube cross-section in such a way that material is initially forced into the extruding tube with less frictional resistance, and subsequently to exert a transverse compacting force substantially at right angles to the movement through the tube by movement of an oscillating wall of the tube with transverse compacting movement in timed relation to the primary compacting force in the longitudinal direction.

It is a further object to provide in combination with a longitudinally reciprocating ram or other longitudinally acting means for feeding material into an extruding chamber, of a transversely movable compacting extruding chamber wall having a portion thereof moving in timed relation with the reciprocating ram and employing also an accommodating transverse support for another portion of said wall whereby the transversely movable wall is provided with an oscillating accommodating movement affording a more efficient transfer of material through an extruding tube and resulting in the ejection of satisfactorily compacted material from the end of the tube with a minimum of frictional loss.

The above and other objects of the invention will appear more fully from the following more detailed description of a mechanism embodying the invention and by reference to the accompanying drawings, forming a part hereof and wherein.

Figure 4:
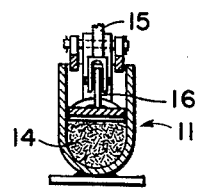
FIG. 4 is a section on line 4—4 of FIG. 3.

Referring to the drawings, a feed ram 10 is mounted to reciprocate longitudinally relative to an extruding tube or member 11 in a substantially cylindrical chamber 12, which chamber extends into extruding chamber 14, which is of substantially U-shaped form in cross section (FIG. 4). The extruding chamber 14 has a press member 16 forming an upper wall of the extruding chamber. Above the cylindrical chamber 12 there is provided a feed throat 18 through which material to be compacted may be fed and this feed throat extends into the cylindrical chamber 12 in such relation as shown so that reciprocation of the ram 10 will move material longitudinally of the cylindrical chamber 12 into the extruding chamber 14. The feed ram 10 is reciprocated by a crank 20 and connecting rod 22, the crank 20 being supported on bearings 24—26. The shaft 28 is driven by suitable drive means which may be applied through suitable mechanical elements such as gear 30, thus affording a means to reciprocate the feed ram 10 in cylindrical chamber 12, thus to exert a feeding and compacting force on material such as hay longitudinally of the chambers 12 and 14.

The press member 16 forming an upper wall of the extruding chamber 14 is positioned for movement transversely of the extruding chamber 14 by oscillating transverse support member 15 and accommodating transverse support member 17. The member 15 is connected to oscillate in a direction transversely of extruding chamber 14 in timed relation with the reciprocation of the ram 10 by suitable means here shown as lever 34 actuated by cranks 32 through connecting links 36, the lever 34 being here shown in two parts on opposite sides of the feed throat 18 and is connected to the member 15 through cross bar 41. The position of the cranks 32 to oscillate the two parts of lever 34 is so timed relative to the crank 20 so that the downward transverse movement of support member 15 will occur on the retracting stroke of ram 10 and thus the timed compacting transverse movement of the end of press member 16 will alternate with the longitudinal compacting movement of the ram 10. The cranks 32 are substantially 90° from the crank 20 in the mechanism illustrated. The opposite end of the press member 16 is supported on the member 17 which is connected to an accommodating cylinder 46 which has a piston 48 acting against an oil column 50 which is connected to an accumulator 52 so that air under pressure on accummulator 52 is available to cause the cylinder 46 and its piston 48 to act in a resilient supporting relationship, thus to exert a resilient accommodating transverse force against the press member 16 at a position spaced from the oscillating support 15. A stabilizing link 54 is pivotally connected between a pin connection on the accommodating support member 17 and a pair of bosses 56 on the top of the chamber 12. This link restrains longitudinal movement of press member 16 and assures movement thereof in the transverse direction as determined by the action of transverse support members 15 and 17.

Figure 1:
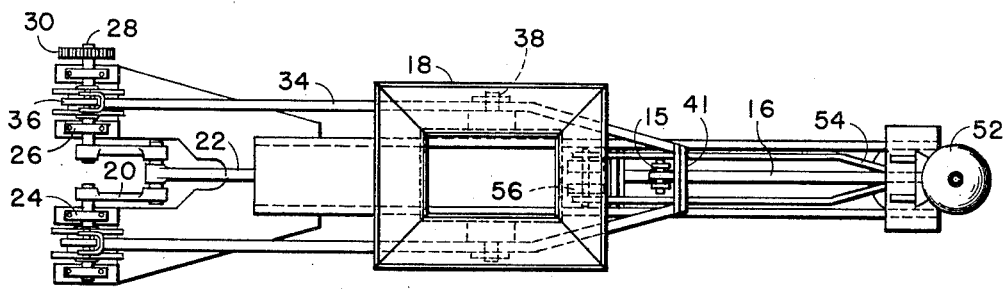
FIG. 1 is a top view of the ram type compacting mechanism employing transverse oscillating-accommodating features of this invention.
Figure 2:
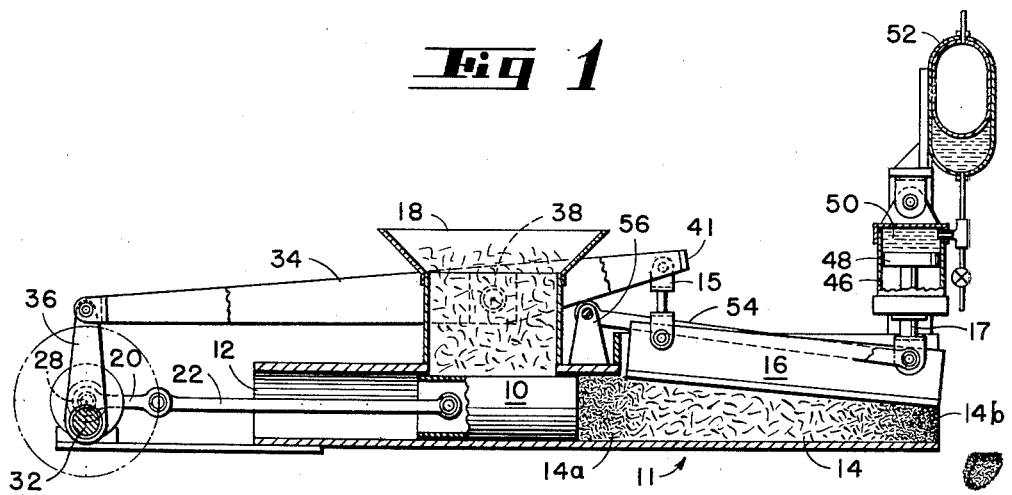
FIG. 2 is a longitudinal side view partly in section of the mechanism shown in FIG. 1, with the reciprocable feed ram at the completion of its compacting stroke and with the transverse oscillating and accommodating supports for the movable wall of the extruding chamber in position to receive material to be compacted.
Figure 3:
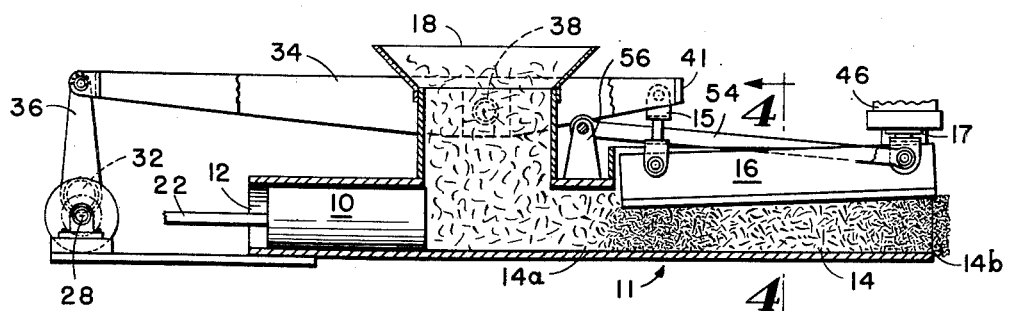
FIG. 3 is a view similar to FIG. 2 but with the reciprocable feed ram in its retracted position and with the transversely movable wall in position to compact the material, and with the accommodating support shown in position it will occupy to induce movement of material as a result of the application of transverse pressure against the wall.

In operation, the feed ram 10 partially compacts the material received from the feed throat 18 into the extruding chamber 14 under the press member 16, the press member 16 being substantially in the position shown in FIG. 2 when the feed ram 10 is in its maximum compacting position, as shown in FIG. 2. It is noted that the press member 16 is slightly inclined, as shown in FIG. 2, with the end nearest the feed ram, controlled by the oscillating transverse support 15, higher than the outer end controlled by the accommodating cylinder and support 17. The material thus compacted into the left-hand portion 14a of the extruding chamber 14 is substantially less in density than is material ready to be extruded at the right-hand end 14b of the chamber 14 adjacent the accommodating support 17. As the feed ram 10 is retracted the oscillating support member 15, operating in timed relation with feed ram 10, pushes the left-hand end of the press member 16 downward to the position shown in FIG. 3 and the accommodating cylinder 46, being provided to supply a resilient support, allows the opposite end adjacent the connection 17 to move upwardly so that the press member is, in effect, rocked on the material in the extruding chamber 14 and the material is by such action squeezed toward the right toward the end 14b of the chamber and the result of repeated movements, as above described, is to progressively push the material through the extruding chamber, in part by the reciprocating feeding and compacting action of the ram 10, but also by the rocking and squeezing action of the press member 16 with its oscillating movement of support 15 in timed relation with the reciprocating ram together with the accommodating resilient support of the accommodating cylinder 46 with its connection to the accumulator 52. Thus the action of compacting and moving the material is accomplished by a combination of longitudinal and transverse force acting on the material. The movement through the extruding chamber is similar to a peristaltic action and is effected by the rocking movement of the press member 16. The material ejected from the end 14b of the extruding chamber 14 adjacent the support 17 is compacted and falls apart in wafer-like forms approximately determined by the charges of material feed by each stroke of the feed ram 10.

It is important to consider that the mechanism selected for illustration is possible of variation by substitution of mechanical equivalents. It is particularly to be noted that the oscillating mechanism to move the end of the press member by transverse movement of the member 15 might be accomplished by other mechanisms in place of the lever 34 and crank 32 and such other mechanism could likewise provide for movement in timed relationship with the reciprocating ram 10 or other longitudinal feeding means. A suitable hydraulic power unit could also be substituted to actuate the transverse oscillating member 15. It is further to be mentioned that the feed throat 18, here used to illustrate the feed of material, is disclosed as an illustration of one of several means to feed the material, but it is the definite intention that various means might be used to feed material into the path of the feed ram or other longitudinal feeding means without departing from the general principles herein disclosed. As a specific illustration, a laboratory test device has been constructed using the principles of this invention wherein the feed ram 10 and the transverse support 15 are both actuated by hydraulic cylinder units, with connecting mechanism to actuate these units alternately, thus to prvide longitudinal and transverse compacting force in combination with an accommodating cylinder as in the mechanism hereinbefore disclosed.

Various other modifications are intended within the scope of the following claims.

We claim:

1. In a compacting mechanism for forming wafers of crop material, an extruding member having a longitudinally extending extruding chamber, a feed ram longitudinally reciprocable for feeding and partially compacting crop material into said extruding chamber for movement therethrough, a press member forming a transversely movable wall extending longitudinally of said extruding chamber, a support for one end of said press member, means actuable in timed relation with the reciprocable movement of said feed ram for oscillating said support transversely of said longitudinally extending chamber, said means comprising a connection between said reciprocable feed ram and said support a second support supporting and connected to said press member at a point spaced longitudinally with reference to said chamber from said first support, a resilient means, and a connection from said resilient means to said second support allowing accommodating transverse movement of said second support on transverse oscillating movement of said first mentioned support member and allowing rocking movement of said press member out of parallelism with the longitudinal axis of said chamber.

2. In a compacting mechanism for forming wafers of crop material, and extruding member having a longitudinally extending extruding chamber, a feed ram longitudinally reciprocable for feeding and partially compacting crop material into said extruding chamber for movement therethrough, a press member forming a transversely movable wall extending longitudinally of said extruding chamber, and means for oscillating and rocking said press member out of parallelism with the longitudinal axis of said chamber and transversely of said longitudinally extending chamber in timed relation to the reciprocating movement of said feed ram comprising, a support for said press member mounted for oscillating movement transversely of said longitudinally extending chamber, a connection from said reciprocable feed ram for oscillating said support, a second support member for said press member connected thereto and spaced longitudinally of said chamber from said first support member, a resilient support for said second support member allowing transverse movement of said second support member on transverse movement of said first support member.

3. In a compacting mechanism for forming wafers of crop material, an extruding member having a longitudinally extending extruding chamber, a feed ram longitudinally reciprocable for feeding and partially compacting crop material into said extruding chamber for movement therethrough, a press member forming a transversely movable wall extending longitudinally of said extruding chamber, and means for oscillating and rocking said press member out of parallelism with the longitudinal axis of said chamber and in a direction generally transversely of said longitudinally extending extruding chamber, said means comprising longitudinally spaced transversely movable supports for said press member, and a connection between at least one of said supports and said reciprocable feed ram.

4. In a compacting mechanism of the character described wherein a reciprocable feed ram is employed to feed and partially compact material in a longitudinal direction into an extruding member having a longitudinally extending chamber, characterized by a press member forming a longitudinal wall of said extruding member transversely movable relative to said chamber, and means to support said wall for both rocking said press member out of parallelism with the longitudinal axis of said chamber and compacting transverse movement to further compact material in said chamber and to assist movement of said material through said extruding member, said means comprising longitudinally spaced transversely movable supports for said press member, and a connection between at least one of said supports and said reciprocable feed ram.

5. In a compacting mechanism for forming wafers of crop material, an extruding member having a longitudinally extending extruding chamber, a feeding means feeding and partially compacting crop material into said extruding chamber for movement therethrough, a press member forming a transversely movable wall extending longitudinally of said extruding chamber, and means for oscillating and rocking said press member out of parallelism with the longitudinal axis of said chamber in a direction generally transversely of said longitudinally extending extruding chamber thereby to further compact said crop material and to assist the movement of said material through said extruding chamber, said means comprising longitudinally spaced transversely movable supports for said press member, and means for oscillating one of said transversely movable supports.

6. In a compacting mechanism for forming wafers of crop material, an extruding member having a longitudinally extending extruding chamber, a feeding means for feeding and partially longitudinally compacting crop material in said extruding chamber for movement therethrough, a press member forming a transversely movable wall extending longitudinally of said extruding chamber, and means for oscillating and rocking said press member out of parallelism with the longitudinal axis of said chamber in a direction generally transversely of said longitudinally extending extruding chamber, said means comprising longitudinally spaced transversely movable supports for said press member, and means for oscillating one of said transversely movable supports.

7. In a compacting mechanism of the character described wherein a feeding means is employed to feed and partially compact material in a longitudinal direction into an extruding member having a longitudinally extending chamber, characterized by a longitudinal wall of said extruding member transversely movable relative to said chamber, and means to support said wall for both a rocking and compacting transverse movement to further compact material in said chamber and to assist movement of said material through said extruding member, said means to support said wall comprising a transverse support member for one end of said movable wall, and means to oscillate said support member for transverse compacting movement, a second support for supporting the opposite end of said movable wall, a resilient means, and a connection from said resilient means to said second support allowing accommodating transverse movement of said second support on transverse oscillating movement of said first-mentioned support member, and a stabilizing link pivotally connected to said wall restraining longitudinal movement of said wall.

References Cited in the file of this patent

UNITED STATES PATENTS

| | | |
|---|---|---|
| 854,465 | Christensen | May 21, 1907 |
| 1,065,648 | Wygant | June 24, 1913 |
| 2,596,872 | Skromme | May 13, 1952 |
| 2,600,827 | Almquist | June 17, 1952 |
| 2,625,097 | Almquist | Jan. 13, 1953 |
| 2,966,842 | Roche | Jan. 3, 1961 |